E. HAYCOX.
MOUNTING FOR DIVIDED AXLES.
APPLICATION FILED MAR. 9, 1911.
992,353.
Patented May 16, 1911.
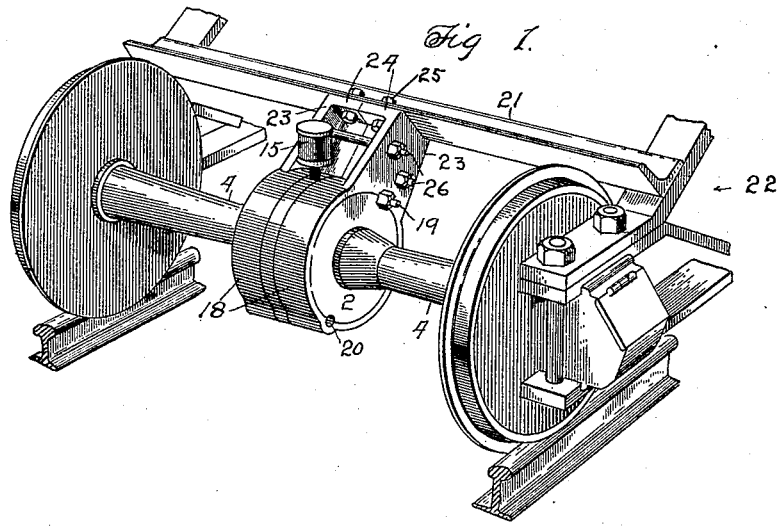
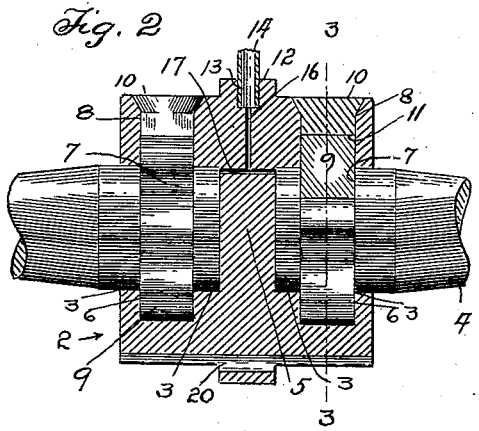
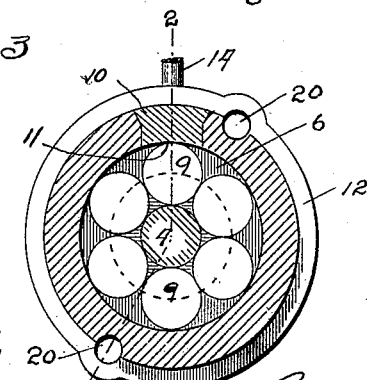
Witnesses
Harry A. Brooks
Fred. W. Brown
Inventor
Edward Haycox
By Alex N. Lidders
Attorney

UNITED STATES PATENT OFFICE.

EDWARD HAYCOX, OF LOS ANGELES, CALIFORNIA.

MOUNTING FOR DIVIDED AXLES.

992,353.  Specification of Letters Patent.  Patented May 16, 1911.

Application filed March 9, 1911. Serial No. 613,387.

*To all whom it may concern:*

Be it known that I, EDWARD HAYCOX, a citizen of the United States of America, residing at Los Angeles, in the county of Los Angeles, State of California, have invented a certain new and useful Mounting for Divided Axles; and I do hereby declare the following to be a full, clear, and exact description of the invention, such as will enable others skilled in the art to which it appertains to make and use the same.

This invention relates to mounting for divided axles, and it may be said to consist in the provision of the novel features and in the novel and improved construction, arrangement and combination of the parts, members and devices, as will be apparent from the description and claims hereinafter.

Objects of the invention are to provide a novel and improved construction for a mounting of the class specified, which shall be simple in character, cheap to manufacture, effective in action, strong and durable in use, and in which the parts may be easily assembled and also readily demounted for renewal or repairs.

Other objects and the advantages of the invention will be apparent to those skilled in the art from a consideration of the following description of the preferred form of construction in which the invention may be embodied, taken in connection with the accompanying drawings, in which, Figure 1 is a perspective view of the invention applied to the axle of car wheels; Fig. 2 is a longitudinal sectional view of the mounting, taken on the line 2—2 of Fig. 3, and Fig. 3 is a cross-sectional view taken on the line 3—3 of Fig. 2.

The bearing block 2, preferably cylindrical in form, may be provided with oppositely disposed recesses 3 in the sides thereof adapted to receive the preferably enlarged end portion of the divided axle 4 closely fitted therein with the ends of the axle bearing evenly against the walls of the central portion 5 of the bearing block. Annular recesses 6 having vertical side walls are provided in the bearing block and each disposed to be contiguous to and in alinement with a similar annular recess 7 formed in each of the adjacent end portions of the divided axle. Openings 8 may be formed in the outer portion of the bearing block to be in communication with the annular recesses 6 to permit of the placing into the recesses 6 and 7 of the cylindrical rollers 9 and said openings 8 may be closed by plugs 10 adapted to fit therein and formed to have their inner end surfaces 11 in continuation of the outer curved walls of the recesses 6.

The bearing block may be provided on its exterior with a central projecting portion 12 having an opening 13 therein at the upper part of the bearing block for the reception of the lower end of the outlet pipe 14 of an oil or grease cup 15; ducts 16 and 17 being provided in the bearing block to conduct the oil or grease from outlet pipe 14 to each of the recesses 3. It will be noted that the oil or grease may accumulate in the lower portion of the recesses 3 and thus insure ample lubrication of the rollers 9 and of the portions of the axle in the bearing block.

Sleeves 18 may be removably fitted over the bearing block and abut against the projecting portion 12 thereon; relative rotation between the sleeves and the bearing block being prevented by means of any suitable keys 19 fitted in suitable keyways 20 formed therein. The sleeves 18 are preferably secured to any suitable support 21 stationarily mounted in a suitable manner, as on the truck frame 22. As shown, the sleeves 18 may be secured to the support 21 by means of side extensions 23 carrying at their upper ends lugs 24 at right angles thereto which lugs are adapted to engage with each other to properly position the parts and be fastened to the support 21 by means of bolts 25. To obtain a firmer and more rigid construction the extensions 23 may be held together by means of bolts 26 passing therethrough.

From the foregoing the mode of operation and the advantages of the invention will readily be apparent to those skilled in the art.

I claim:

1. The combination with a divided axle, of a bearing block provided with oppositely disposed recesses in the sides thereof adapted to receive the adjacent end portions of said axle closely fitted therein with the ends of the axle bearing evenly against the end walls of said recesses, said bearing block substantially cylindrical in form and provided with annular recesses having vertical side walls and each disposed to be contiguous to and in alinement with a similar annular recess formed in each of said end portions of the axle, cylindrical rollers fitted in said annular recesses, plugs fitted in openings formed in the outer portion of the bearing block to be in communication with said annular recesses, said plugs formed to have their inner end surfaces in continuation of the outer curved walls of the annular recesses in the bearing block, sleeves removably fitted over the bearing block, means to prevent relative rotation between said sleeves and said bearing block, a stationary support, means securing said sleeves to said support, and means to lubricate said rollers and said end portions of the axle in the bearing block.

2. The combination with a divided axle, of a bearing block provided with oppositely disposed recesses in the sides thereof adapted to receive the adjacent end portions of said axle closely fitted therein with the ends of the axle bearing evenly against the end walls of said recesses, said bearing block substantially cylindrical in form and provided with annular recesses having vertical side walls and each disposed to be contiguous to and in alinement with a similar annular recess formed in each of said end portions of the axle, cylindrical rollers fitted in said annular recesses, plugs fitted in openings formed in the outer portion of the bearing block to be in communication with said annular recesses, said plugs formed to have their inner end surfaces in continuation of the outer curved walls of the annular recesses in the bearing block, sleeves removably fitted over the bearing block, said sleeves abutting against a central projecting portion on the bearing block, means to prevent relative rotation between the sleeves and the bearing block, a stationary support, means to secure said sleeves to said support, comprising side extensions on the sleeves carrying at their upper ends lugs at right angles thereto, said lugs adapted to engage with each other to properly position the parts, and means fastening said lugs to said support, means to hold said extensions together, and means to lubricate said rollers and the end portions of the axle in the bearing block, substantially as described.

In testimony whereof, I have signed my name to this specification in the presence of two subscribing witnesses at Los Angeles, county of Los Angeles, State of California, this 4th day of March A. D. 1911.

EDWARD HAYCOX.

Witnesses:
HENRY E. BRETT,
A. H. LIDDERS.

---

Copies of this patent may be obtained for five cents each, by addressing the "Commissioner of Patents. Washington, D. C."